United States Patent Office 3,528,979
Patented Sept. 15, 1970

3,528,979
PHTHALAZINE-BROMINE COMPLEXES AND
METHOD OF PREPARING SAME
Arthur Hirsch, Montreal, Quebec, Canada, and Demetrius
G. Orphanos, Waltham, Mass., assignors to Canadian
Technical Tape Ltd., Montreal, Quebec, Canada
No Drawing. Filed May 8, 1967, Ser. No. 638,189
Int. Cl. C07d 51/06
U.S. Cl. 260—250
10 Claims

ABSTRACT OF THE DISCLOSURE

A new composition is shown having the generalized formula $R.(Br_2)_n$ where R is a phthalazine and $n$ is at least 1 and no more than 2. Some of the phthalazines which can be utilized in connection with the composition are phthalazine itself, 1-phenylphthalazine, 1,4-dibromophthalazine, or 1,4-dichlorophthalazine. The compositions are useful as insecticides and as intermediates for bromination.

A method is also shown of producing the bromine complexes of this invention which involve the method steps of reacting at least molar amounts of the phthalazine and of bromine dissolved in a suitable solvent until the bromine complex is precipitated. The preferred solvent utilized is carbon tetrachloride.

A method of bromination is also shown which comprises the addition of the bromine complexes of this invention to the material to be brominated.

DESCRIPTION OF THE INVENTION

This invention deals with novel bromine complexes of nitrogen heterocyclic organic compounds and the process for their preparation. More specifically it deals with novel bromine complexes of phthalazine and phthalazine derivatives.

Bromine has long found utility in the preparation of a variety of pesticides. Bromine's acceptance, however, has been severely limited by its corrosive and toxic properties. We have now discovered a suitable means for handling bromine safely in dry powder or in solution at room as well as elevated temperatures. Moreover, our novel bromine complexes are characterized by very high bromine content, good stability, and ready availability of the complexed bromine.

It has long been known that bromine reacts with certain nitrogen containing heterocyclic compounds. These reactions do yield a variety of products, including among others bromine complexes. These bromine complexes constitute usually less than 50% of the reaction products and are thus badly contaminated with impurities. The preparation of the bromine complexes of the prior art is thus uneconomical. Furthermore, the bromine complexes of the prior art have a low bromine content which necessitates the use of large quantities of these products in order to achieve the desired effect.

It is an object of our invention to provide novel bromine complexes of nitrogenous heterocyclic compounds. It is a further object of our invention to provide means for producing these complexes in good yield and high purity. Another object of our invention is the preparation of novel bromine complexes of nitrogeneous heterocyclic compounds of good stability under a variety of storage conditions. The general scheme of the preparation of our novel bromine complexes may best be presented as

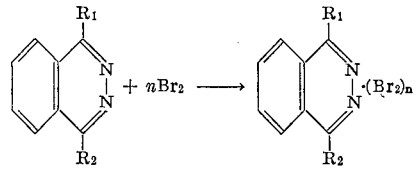

where $R_1$ and $R_2$ may be independently chosen from hydrogen, aliphatic and aromatic hydrocarbons, and halogens, and where $n$ is not greater than 2. Alternatively the new compositions may be presented as having the generalized formula $R.(Br_2)_n$ where R is a phthalazine and $n$ has a value of at least 1 and no greater than 2. As specific examples of the types of phthalazines that may be employed mention is made of phthalazine itself, 1-phenylphthalazine, 1,4-dibromophthalazine, or 1,4-dichlorophthalazine, as set forth here and after. The details of the invention will be apparent from a consideration of the following specific examples:

Example I

To a solution of 130 g. (1 mole) phthalazine in 8 litres of carbontetrachloride was added at room temperature with vigorous stirring a solution of 160 g. (1 mole) bromine in 2 litres of carbontetrachloride. The addition took 2 to 3 minutes. After 30 minutes of continuous stirring, a yellow crystalline powder was separated. It was washed with carbontetrachloride and vacuum dried. The yield of this product was quantitative. The complex contained 55.5% available bromine and was stable for prolonged periods at room temperature.

Example II 1-phenylphthalazine-bromine complex was prepared by a procedure similar to that employed in Eaxmple I. The complex was a red colored powder melting at 105° C. The yield of this reaction was quantitative.

Example III 1,4-dibromophthalazine-bromine complex was prepared from 2.64 g. (0.01 mole) of 1,4-dibromophthalazine dissolved in 15 ml. of chloroform and 85 ml. of carbontetrachloride. To this solution was added under vigorous stirring, a solution of 1.6 g. (0.01 mole) bromine in 10 ml. of carbontetrachloride. Agitation was continued for an additional 20 minutes. Upon removal of solvents there remained a quantitative yield of an orange colored powder, melting at 195° C.

Example IV 1,4-dichlorophthalazine-bromine complex was prepared by the procedure of Example III. The product was a yellow colored powder, melting at 155° C.

The bromine complexes of this invention may be employed as pesticides. Either alone, or in combination with other materials, these bromine complexes disrupt the proper life functions and injure vital organs of pests.

The novel bromine complexes of this invention may furthermore be employed in "bromination." The chemical reaction, generally referred to as "bromination" may be one of two types; addition or substitution. The bromine complexes of our invention may be employed to bring about bromination of organic substances by either addition or substitution. Addition reactions usually involve unsaturated organic compounds, whereby bromine adds to the olefinic or acetylenic bonds. Example V demonstrates this type of reaction.

Example V

To a yellow colored solution of 1 gram of the complex prepared in Example I in 10 ml. of tetrahydrofurane was added 1 gram of cyclohexene. The yellow color was discharged and pure phthalazine could be isolated.

The utilization of the novel bromine complexes of our invention in the bromination via substitution is illustrated in Example VI.

Example VI 1 gram of solid phthalazine-bromine complex, prepared in Example I, was added to 10 ml. of acetone. The resulting yellow solution was decolorized upon refluxing for 1 minute. A white crystalline material, separating during this reaction, was identified as phthalazine hydrobromide. No attempt was made to isolate the bromoacetone.

The present invention affords a means of safely handling active bromine. It furthermore permits the utilization of bromine in chemical reactions at elevated temperatures and atmospheric pressures. Heretofore such reactions would have required high pressure apparatus.

We claim:

1. A composition of matter as described in claim 10 where R is phthalazine and $n$ is equal to 2.

2. A method as described in claim 7 said solvent being carbon tetrachloride and said phthalazine being dissolved in said solvent prior to commencing said reaction.

3. A method as described in claim 2 the molar concentration of said bromine being at least twice that of said phthalazine.

4. A method as described in claim 3 including the additional steps of separating said precipitate from said mixture and washing and drying said precipitate.

5. A method as described in claim 4 said precipitate being washed in carbontetrachloride, and thence being vacuum dried.

6. A composition of matter having the generalized formula

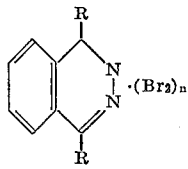

where R is selected from the class consisting of halogen, phenyl or hydrogen and $n$ has a value of from 1 to 2.

7. A method of producing a bromine complex of a phthalazine selected from the class consisting of phthalazine, 1-phenylphthalazine, 1,4-dibromophthalazine, or 1,4-dichlorophthalazine, consisting of the step of reacting at least molar amounts of said phthalazine and of bromine dissolved in a solvent until said bromine complex is precipitated.

8. A method of bromination consisting of the steps of adding a brominating compound to the material to be brominated, said brominating compound having the generalized formula R.$(Br_2)_n$ where R is a phthalazine selected from the class consisting of phthalazine, 1-phenylphthalazine, 1,4 - dibromophthalazine, or 1,4 - dichlorophthalazine, and $n$ has a value of from 1 to 2, maintaining said brominating compound in contact with the material to be brominated until bromination takes place, and then separating said brominated material.

9. As a composition of matter, a pesticide having the generalized formula R.$(Br_2)_n$ where R is a phthalazine selected from the class consisting of phthalazine, 1-phenylphthalazine, 1,4 - dibromophthalazine, or 1,4 - dichlorophthalazine, and $n$ has a value of from 1 to 2.

10. A composition of matter having the generalized formula R.$(Br_2)_n$ wherein R is a phthalazine selected from the class consisting of phthalazine, 1-phenylphthalazine, 1-dibromophthalazine, or 1,4-dichlorophthalazine, and $n$ is at least one and no more than 2.

References Cited

Frear, Chemistry of the Pesticides, pp. 1–7 (1955), third edition.

NICHOLAS S. RIZZO, Primary Examiner

U.S. Cl. X.R.

260—999